US007047928B2

(12) United States Patent
Rengmyr

(10) Patent No.: US 7,047,928 B2
(45) Date of Patent: May 23, 2006

(54) METHOD FOR CASTING AN IRON ALLOY REINFORCED ALUMINUM ALLOY ENGINE BLOCK

(75) Inventor: Staffan Rengmyr, Gothenburg (SE)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 10/248,142

(22) Filed: Dec. 20, 2002

(65) Prior Publication Data

US 2003/0116114 A1 Jun. 26, 2003

(30) Foreign Application Priority Data

Dec. 21, 2001 (EP) ................................. 01850217

(51) Int. Cl.
*F16C 35/02* (2006.01)

(52) U.S. Cl. ............................. 123/195 R; 123/195 H

(58) Field of Classification Search ............. 164/270.1, 164/1; 123/195 R, 195 H See application file for complete search history.

(56) References Cited

U.S. PATENT DOCUMENTS

| | | | | |
|---|---|---|---|---|
| 256,038 | A * | 4/1882 | Pedder | 164/270.1 |
| 1,288,326 | A * | 12/1918 | West | 164/1 |
| 4,708,190 | A * | 11/1987 | Hack et al. | 164/76.1 |
| 5,203,854 | A * | 4/1993 | Nilsson et al. | 384/433 |
| 5,390,723 | A * | 2/1995 | Mohla et al. | 164/57.1 |
| 5,597,031 | A * | 1/1997 | Weimann | 164/270.1 |
| 5,732,762 | A * | 3/1998 | Usui et al. | 164/270.1 |
| H1769 | H * | 1/1999 | LeClair et al. | 164/6 |
| 6,557,619 | B1 * | 5/2003 | Katoh | 164/270.1 |

* cited by examiner

*Primary Examiner*—Henry C. Yuen
*Assistant Examiner*—Jason Benton
(74) *Attorney, Agent, or Firm*—Raymond L. Coppiellie; Brooks & Kushman, PC

(57) ABSTRACT

A method of high pressure die casting in iron alloy reinforcements for main bearing scantlings in an aluminum alloy engine block for an internal combustion engine. Prior to casting, reinforcements (1) having bores (6) for main bearing screws are placed in a die cavity (21), so that cores for main bearing screws protrude into the bores in each reinforcement on one side of the reinforcement. Then the reinforcements are fixed in the die cavity by placing a cylinder liner core (25) against a surface (27) of the reinforcement on the opposite side of the reinforcement.

9 Claims, 2 Drawing Sheets

METHOD FOR CASTING AN IRON ALLOY REINFORCED ALUMINUM ALLOY ENGINE BLOCK

BACKGROUND OF INVENTION

1. Technical Field

The present invention relates to a method of high pressure die casting in a first metal alloy reinforcements for main bearing scantlings in a second metal alloy block for an internal combustion engine.

2. Background

Engine blocks cast of a light alloy such as aluminum alloy have the primary advantage that they are light in comparison with cast iron alloy engine blocks, thereby offering the opportunity to achieve high power/weight ratios in the engine. They, however, have the disadvantage that they are not as strong as iron alloy engine blocks and are not as well able to withstand the stresses encountered in engine operation. Particularly the scantlings in the engine, which provide support for the main bearings, are subject to high stresses.

It is previously known to increase the strength of the scantlings in an aluminum alloy engine block by casting an iron core reinforcement in the aluminum material of each scantling. Such a reinforcement forms a semi-circular surface facing the main bearing. According to a previously known method (U.S. Pat. No. 4,643,145) the reinforcements for the scantlings are positioned in the engine block die by means of rods which are screwed into the bores for the main bearing screws. The die is then gravity filled with molten aluminum alloy to cast the block around the reinforcements. After solidification the casting is removed from the die and the rods removed from the reinforcements.

SUMMARY OF INVENTION

To be able to high pressure die casting in reinforcements made of a ferrous metal alloy in an engine block made of a light metal alloy it is essential that the reinforcements are securely fixed in the die, so the they will not become dislocated in the die when the molten light metal alloy is introduced. One purpose of the present invention is therefore to achieve a method described by way of introduction by means of which it is possible to securely fix the reinforcements in the die without the need to use other means than those normally used when die casting a light metal alloy engine block without scantling reinforcements.

This can be achieved according to the invention by means of a method, which comprises the steps of placing a first metal alloy reinforcement having bores for main bearing screws and a semi-circular surface facing the main bearing between said bores at each scantling location in the die cavity, so that first core means in the die cavity protrude into said bores on one side of the reinforcement, fixing the reinforcement in the die cavity by placing second core means in the die cavity against a surface on the opposite side of the reinforcement, and introducing and pressurizing a molten second metal alloy in the die cavity.

By clamping the reinforcement between existing cores on opposite sides of the reinforcement there is no need for other means such as fixing rods or the like. Preferably, according to the invention, the cores for the main bearing screws are used to position the reinforcement and cylinder liner cores on the opposite side are used to clamp the reinforcement against the surface of the main bearing screw cores.

Another purpose of the present invention is to achieve a ligth metal, preferably aluminum, alloy block described by way of introduction which is specially designed to be die cast using the method according to the present invention.

This can be achieved according to the invention by virtue of the fact that the maximum width of said reinforcement, in the axial direction of the engine block, is larger than than the minimum thickness of the cylinder walls between adjoining cylinder bores.

This means that an area of the surface of the reinforcement facing the top of the engine block will be exposed inside the cylinder bore and, when the cylinder liner core is inserted into the liner, the bottom surface of the liner core will eventually hit this exposed reinforcement surface and press the reinforcement against the main bearing screw cores on the opposite side of the reinforcement.

DETAILED DESCRIPTION

Figure 1A:
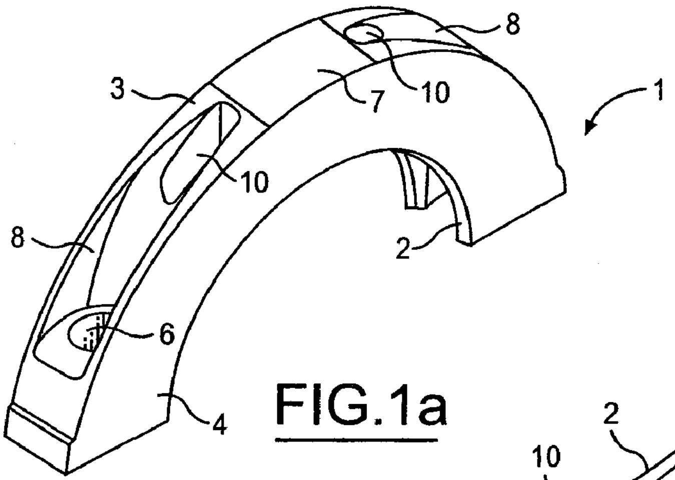
FIG. 1*a* and FIG. 1*b* are perspective views from above and from below, respectively, of a scantling reinforcement to be die cast in an engine block according to one embodiment of the present invention.
Figure 1B:
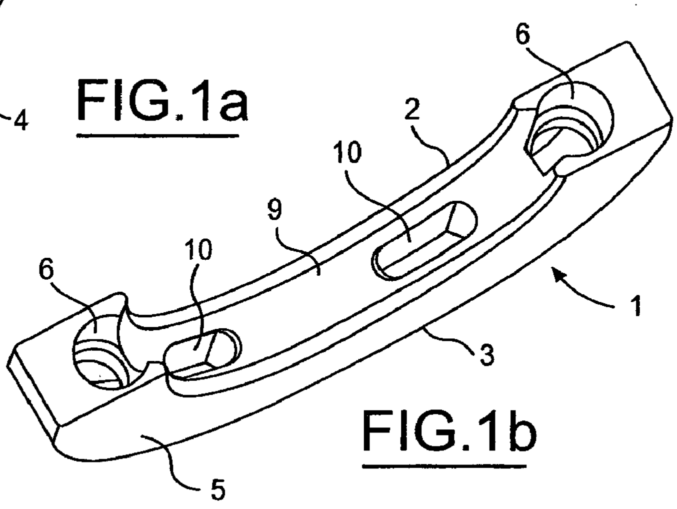

In FIGS. 1*a* and 1*b*, 1 generally designates a scantling reinforcement made of a ferrous metal alloy. The reinforcement 1 is essentially semi-circular with inner and outer semi-circular surfaces 2 and 3, respectively, and opposite flat surfaces 4 and 5. The end portions of the reinforcement 1 have bores 6 for main bearing bolts (not shown), by means of which a main bearing cap can be attached to the engine block at the scantling location. The central portion of the outer surface 3 has a flat area 7, the purpose of which will be described below with reference to FIG. 2. Also, the outer surface 3 is formed with a peripheral depression or channel 8 on each side of the central flat area 7. The inner surface 4 is formed with a peripheral depression or channel 9 which runs from one of the bores 6 to the other. The outer channel 8 communicates with the inner channels 9 via through-channels 10. In the finished engine block the material in said channels 8, 9 and 10 forms a coherent mass with the material in the engine block to secure a mechanical grip between the ferrous reinforcement 1 and the surrounding light metal material.

Figure 2:
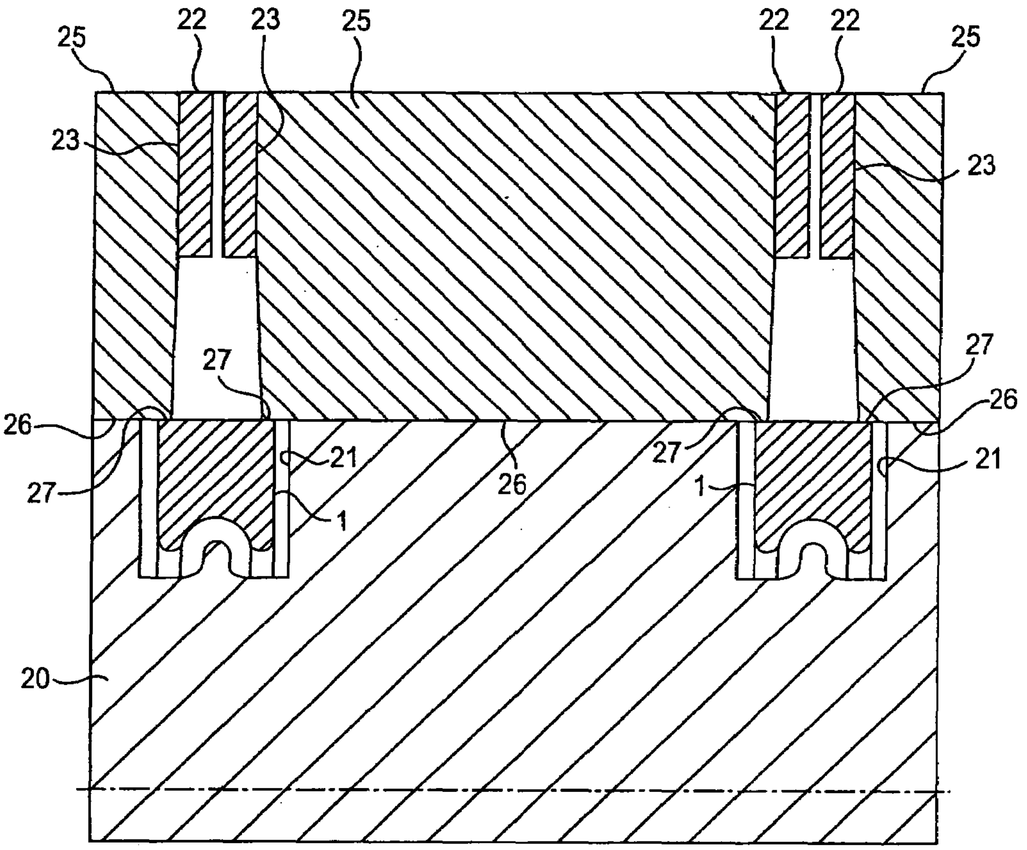
FIG. 2 is a cross-section of the reinforcement shown in FIG. 1*a* and FIG. 1*b* and cylinder liners in a die casting die.

In FIG. 2, 20 designates a lower portion of a die casting die. Reinforcements 1 are first inserted in cavities 21 in the die portion 20 and positioned by cores (not shown) for the bores 6 for main bearing screws. FIG. 2 also shows three consecutive cylinder liners 22 with cylinder bores 23. After positioning of the reinforcements 1 a liner core 25 is inserted into each liner 22, so that bottom surfaces 26 rest on edges 27 of the above mentioned flat areas 7 of the surfaces 3, thereby securing the reinforcements 1 in the die cavity 21 before a molten light metal alloy such as an aluminum alloy is introduced and pressurized in the die cavity 21.

Figure 3:
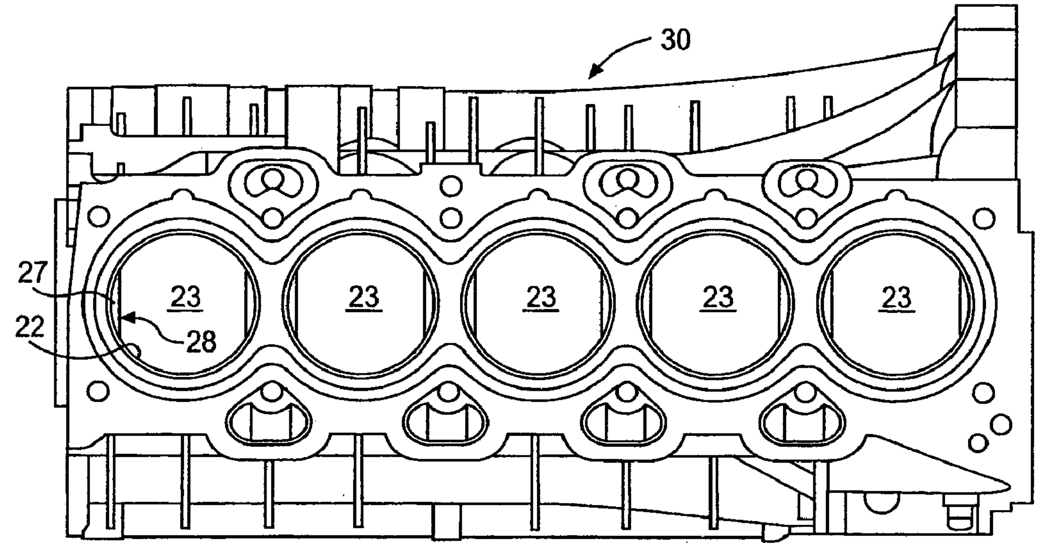
FIG. 3 is a top view of a light metal alloy, e.g. aluminum alloy, block according to one embodiment of the present invention.

FIG. 3 shows a light metal alloy block 30 for a five cylinder engine with six reinforcements made of a ferrous metal alloy 1 cast in according to the above described method. In FIG. 3 the edges 27 of the flat areas 7 of the surfaces 3 of the reinforcement 1 in each scantling 28 can be seen.

According to the above described preferred method, cylinder liner cores are used to secure the reinforcements from above. It is also possible within the scope of the invention to design the reinforcements with portions projecting upwards and positioned such that cores for other cavities in the engine block than the cylinder bores could be used for the same purpose.

What is claimed is:

1. A method of high pressure die casting in first metal alloy reinforcements for main bearings scantlings in a second metal alloy engine block for an internal combustion engine, comprising the following steps:

placing a first metal alloy reinforcement having bores for main bearing screws and an essentially semi-circular surface facing the main bearings between said bores at each scantling location in a die cavity, so that first core means in the die cavity protrude into said bores on one side of the reinforcement;

fixing the reinforcement in the die cavity by placing second core means in the die cavity against a surface of the reinforcement on an opposite side; and introducing and pressurizing a molten second metal alloy in the die cavity.

2. A method according to claim 1, wherein the reinforcement is placed in the die cavity, so that cores for main bearing screw bores protrude into the bores in the reinforcement on said one side of the reinforcement.

3. A method according to claim 1, wherein the reinforcement is fixed in the die cavity by placing a cylinder liner core against the surface of the reinforcement on said opposite side.

4. A method according to claim 1, wherein reinforcements made of an aluminum alloy are placed in the die cavity and that a molten aluminum alloy is thereafter introduced and pressurized in the die cavity.

5. A method of high pressure die casting in first metal alloy reinforcements for main bearing scantlings in a second metal alloy engine block for an internal combustion engine, comprising the following steps:

placing a first metal reinforcement having bores for main bearing screws and an essentially semi-circular surface facing the main bearings between said bores at each scantling location in a die cavity, so that cores for main bearing screw bores in the die cavity protrude into said bores on one side of the reinforcement;

fixing the reinforcement in the die cavity by placing a cylinder liner core against a surface of the reinforcement on an opposite side; and introducing and pressurizing a molten second metal alloy in the die cavity.

6. A method according to claim 5, wherein reinforcements made of an iron alloy are placed in the die cavity and that a molten aluminum alloy is thereafter introduced and pressurized in the die cavity.

7. The method according to claim 5, wherein an outer peripheral surface of said reinforcement has a flat central area.

8. The method according to claim 5, wherein depressions are formed in opposite peripheral surfaces of the reinforcement.

9. The method according to claim 5, wherein the engine block is made of an aluminum alloy and the reinforcements of an iron alloy.

* * * * *